United States Patent
Berkson et al.

(10) Patent No.: US 7,178,885 B2
(45) Date of Patent: Feb. 20, 2007

(54) HAND-HELD COMPACT DISC STORAGE, SINGLE-HAND DEPLOYMENT AND RETRIEVAL DEVICE

(75) Inventors: Bruce R. Berkson, Sedona, AZ (US); Todd Saczalski, Sedona, AZ (US)

(73) Assignee: CDSAF, Inc., Sedona, AZ (US)

( * ) Notice: Subject to any disclaimer, the term of this patent is extended or adjusted under 35 U.S.C. 154(b) by 495 days.

(21) Appl. No.: 10/719,043

(22) Filed: Nov. 20, 2003

(65) Prior Publication Data

US 2004/0107432 A1   Jun. 3, 2004

Related U.S. Application Data

(60) Provisional application No. 60/428,151, filed on Nov. 20, 2002.

(51) Int. Cl.
  B65D 85/57    (2006.01)
  G11B 23/03    (2006.01)
  A47B 81/06    (2006.01)
(52) U.S. Cl. .................. 312/9.11; 312/9.16; 206/308.1; 720/728
(58) Field of Classification Search .............. 312/9.1, 312/9.11, 9.9, 9.16, 9.17, 9.21, 9.26, 9.25, 312/9.24, 9.31, 9.23; 206/308.1, 312, 308.2, 206/39.4, 817; 720/728, 719, 720, 732, 733
See application file for complete search history.

(56) References Cited

U.S. PATENT DOCUMENTS

| | | | | |
|---|---|---|---|---|
| 3,112,966 A | * | 12/1963 | Reid | 312/9.9 |
| 3,862,555 A | * | 1/1975 | Wirth | 70/63 |
| 4,664,454 A | * | 5/1987 | Schatteman et al. | 312/9.19 |
| 4,728,157 A | * | 3/1988 | David, Jr. | 312/9.16 |
| 5,000,316 A | * | 3/1991 | Lerner | 206/308.1 |
| 5,265,721 A | * | 11/1993 | Castritis | 206/308.1 |
| 5,495,939 A | * | 3/1996 | Castritis | 206/307 |
| 5,590,768 A | * | 1/1997 | Hilton et al. | 206/308.1 |
| 5,676,246 A | * | 10/1997 | Gloger | 206/308.1 |
| 5,799,783 A | * | 9/1998 | Cheris et al. | 206/308.1 |
| 5,944,180 A | * | 8/1999 | Koh et al. | 206/308.1 |
| 6,070,722 A | * | 6/2000 | Ng | 206/308.1 |
| 6,086,170 A | * | 7/2000 | Chen | 312/9.11 |
| 6,112,894 A | * | 9/2000 | Kikuchi et al. | 206/308.1 |
| 6,230,891 B1 | * | 5/2001 | Usui et al. | 206/454 |
| 6,283,281 B1 | * | 9/2001 | Pandolph et al. | 206/308.1 |
| 6,712,223 B2 | * | 3/2004 | Kuo | 211/40 |
| 6,817,025 B2 | * | 11/2004 | Boorman | 720/719 |
| 6,896,133 B2 | * | 5/2005 | Spagna | 206/308.2 |
| 2005/0023160 A1 | * | 2/2005 | Peng-Chen | 206/308.1 |
| 2005/0205442 A1 | * | 9/2005 | Spagna | 206/308.2 |

* cited by examiner

*Primary Examiner*—Janet M. Wilkens
*Assistant Examiner*—Timothy M Ayres
(74) *Attorney, Agent, or Firm*—Kelly Lowry & Kelley, LLP

(57) ABSTRACT

A hand-held disc storage, deployment and retrieval device includes a housing defining an interior cavity adapted to store a media disc therein. A manually-actuated slider is disposed within the interior cavity and movable along guide tracks formed in the housing between a disc deployment position and a disc retrieval position. A manually-actuated lever mechanism is operably connected to the slider for deploying and retrieving the disc from the housing. Disc tracks and a ramp are formed in the housing for guiding the disc into and out of the interior cavity. Multiple housings may be interlocked in stacking relationship to one another. The disc may also be locked within the housing, or a case provided for locking multiple housings and discs to one another within the case.

27 Claims, 6 Drawing Sheets

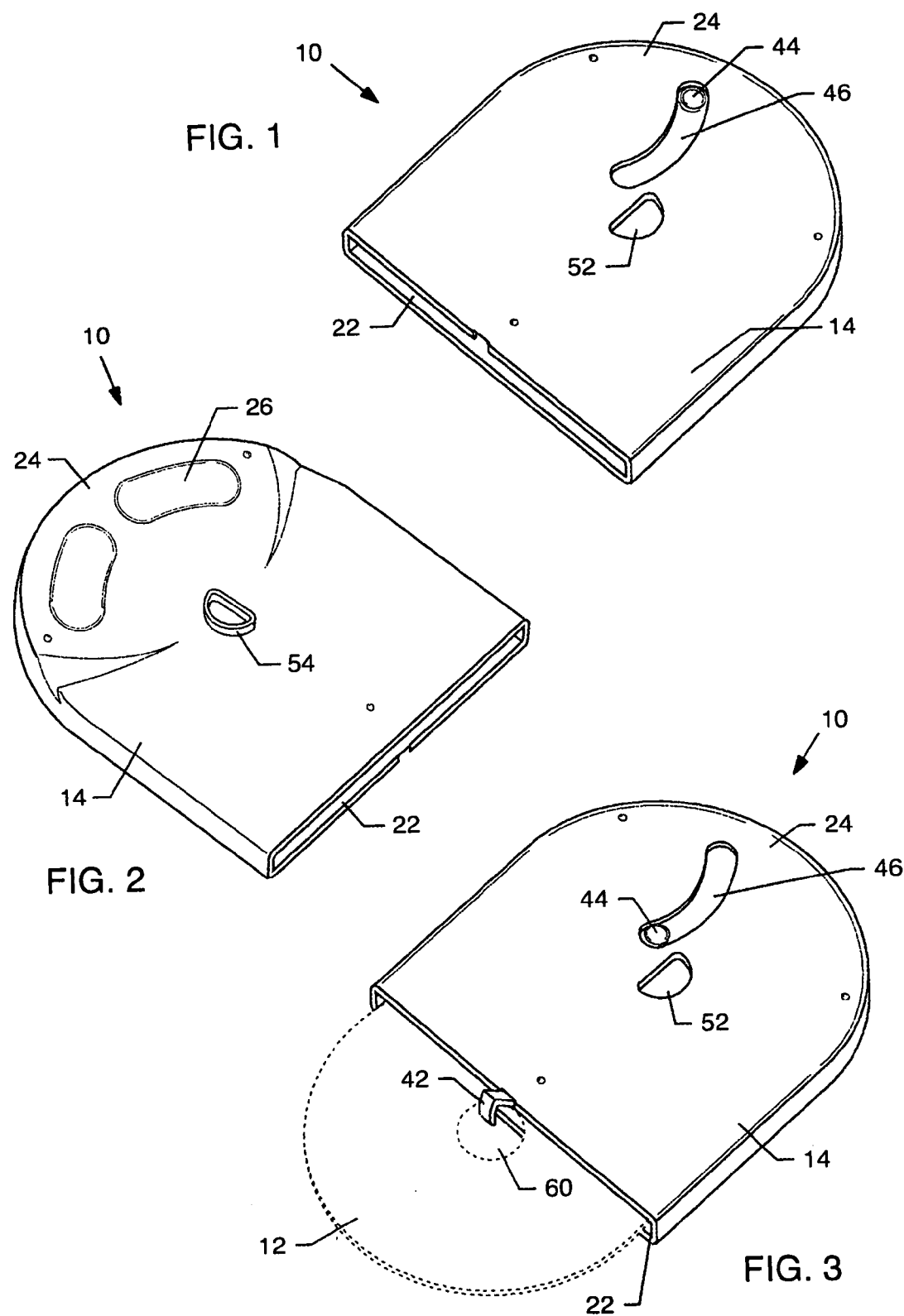

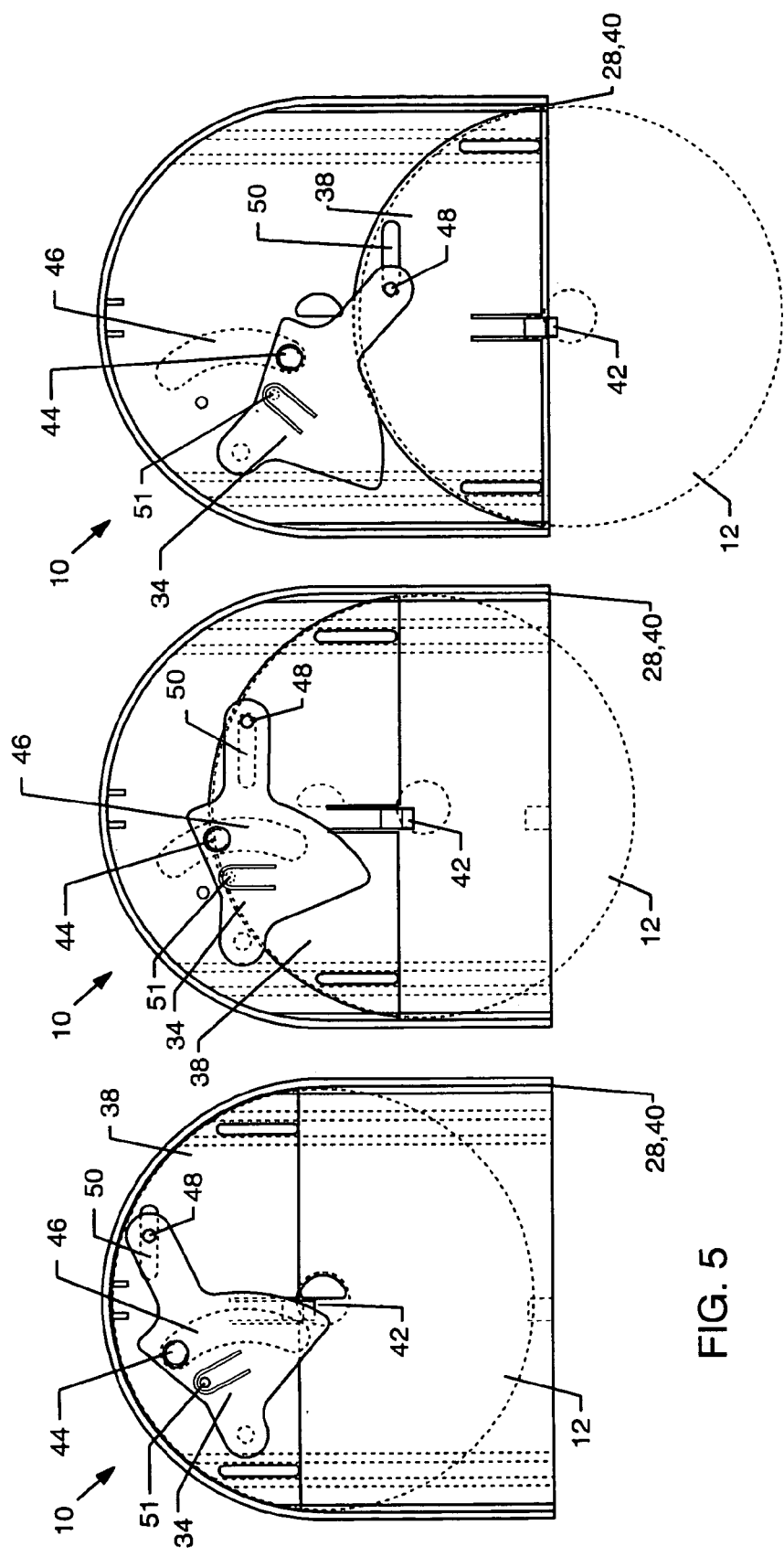

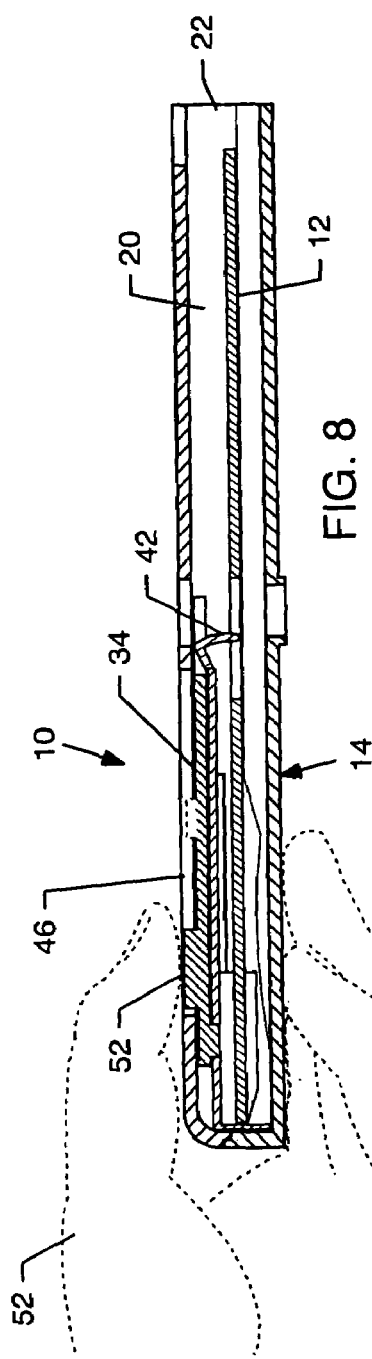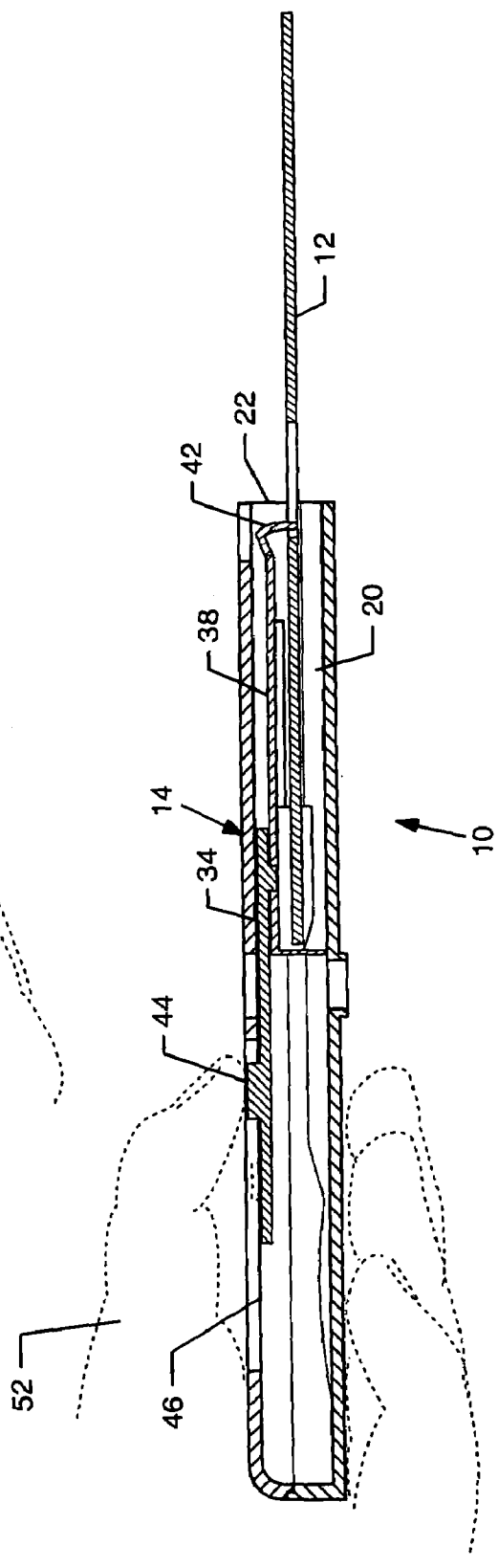

HAND-HELD COMPACT DISC STORAGE, SINGLE-HAND DEPLOYMENT AND RETRIEVAL DEVICE

RELATED APPLICATION

This application claims priority to U.S. Provisional Patent Application Ser. No. 60/428,151, filed Nov. 20, 2002.

BACKGROUND OF THE INVENTION

The present invention generally relates to the handling of compact discs. More particularly, the present invention relates to a hand-held device which is used for compact disc storage and single-hand deployment and retrieval of compact discs into their readers.

It is known that the handling of traditional compact disc cases in moving vehicles is responsible for many accidental deaths each year. Traditional compact disc cases, often referred to as jewel cases, require drivers to divert attention away from driving in at least the following two ways: (1) drivers are required to take their eyes off the road in order to distinguish the hinged end from the opening end of a traditional compact disc case; and (2) drivers are required to take both hands off the steering wheel in order to open the case and remove the compact disc. This is due to the fact that traditional cases are very difficult to open with a single hand. Other drawbacks to the use of traditional compact disc cases in motor vehicles include the fact that the cases lack any stacking or interlocking mechanism to secure them during operation of the motor vehicle.

Another problem with traditional CD cases is that they are made out of inexpensive plastic and prone to breakage or failure. Due to the repetitive opening and closing of the hinge mechanisms of such cases, the hinges fail before the life of the CD is exhausted. However, the CD must be protected from environmental factors which might cause scratching or the like and destroy the CD.

Scratching of CD's, DVD's, CDRW's, or game system discs is an enormous problem. A music CD can cost $10.00 to $20.00. A game system CD can cost $60.00 or more. A DVD or CDRW can contain computer software or databases which can be worth thousands or even millions of dollars, and sometimes irreplaceable. Thus, the handling of these discs is currently a concern. Another concern is the security of these discs. A zipper case might contain several thousand dollars worth of CD's, and a CDRW disc may contain millions of dollars worth of proprietary data. Currently, these discs are held in jewel cases or zipper cases which can easily be stolen.

Accordingly, there is a need for a CD case whose use in motor vehicles requires a minimum amount of time and attention to be diverted away from driving, thus improving safety. Specifically, there is a need for a CD case that can be manipulated with only a single hand, that does not require a driver to look to see which end of the case opens, that is not easily susceptible to cracking or breaking, and that has a mechanism for secure stacking when multiple cases are present. What is also needed is a security system for such media discs. The present invention fulfills these needs and provides other related advantages.

SUMMARY OF THE INVENTION

The present invention resides in a hand-held device for storing media discs, such as compact discs, and which enables single-hand deployment and retrieval of the compact disc from the reading device. The device generally comprises a housing defining an interior cavity adapted to store a disc therein. An aperture is formed in the housing and configured for receiving the disc therethrough and into and out of the interior cavity. A manually-actuated slider is disposed within the interior cavity and movable between a disc deployment position, wherein the disc with an interior cavity is moved by the slider through the aperture and out of the interior cavity, in a disc retrieval position wherein the disc is moved into the interior cavity.

A manually-actuated lever mechanism is operably connected to the slider for deploying and retrieving the disc. The lever-mechanism, in a particularly preferred embodiment, includes a lever extending from the housing and connected to a pivot arm within the housing and engagable with the slider for moving the slider between the deployment and retrieval positions. The lever travels along a slot formed in the housing. The pivot arm is pivotally connected to the housing. The slider moves along guided tracks formed in the housing. The slider preferably includes a hook adapted to engage a portion of the disc.

To facilitate deployment and retrieval of the disc, disc tracks are formed in the housing for guiding the disc into and out of the interior cavity. A disc entry ramp is also disposed adjacent to the aperture.

In a particularly preferred embodiment, the exterior conformation of the housing is configured to interlock with the exterior conformation of the second housing stacked thereon. For example, the housing may include a protuberance extended from a surface thereof, and a protuberance-accepting depression formed in a generally opposite surface thereof.

Means are also provided for locking the disc within the housing. Such locking means can comprise opposing apertures formed in the housing and alignable with a central aperture of the disc for acceptance of a locking pin therethrough. A case may be provided which is adapted for storing multiple housings therein in stacked relation with the locking pin extending from one end of the case, through the multiple housings and discs, and out an opposite end of the case.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a top perspective view of a disc storage, deployment and retrieval device embodying the present invention;

FIG. 2 is a bottom perspective view of the device of FIG. 1;

FIG. 3 is a perspective view similar to FIG. 1, illustrating a media disc being deployed therefrom;

FIGS. 5–7 are partial cross-sectional top views, illustrating the storage and deployment of a media disc from the device, in accordance with the present invention;

FIG. 8 is a cross-sectional view illustrating the hand-held nature of the device, with a media disc stored therein;

FIG. 9 is a cross-sectional view similar to FIG. 8, but illustrating the deployment of the media disc from the device;

DETAILED DESCRIPTION OF THE PREFERRED EMBODIMENTS

Figure 4:
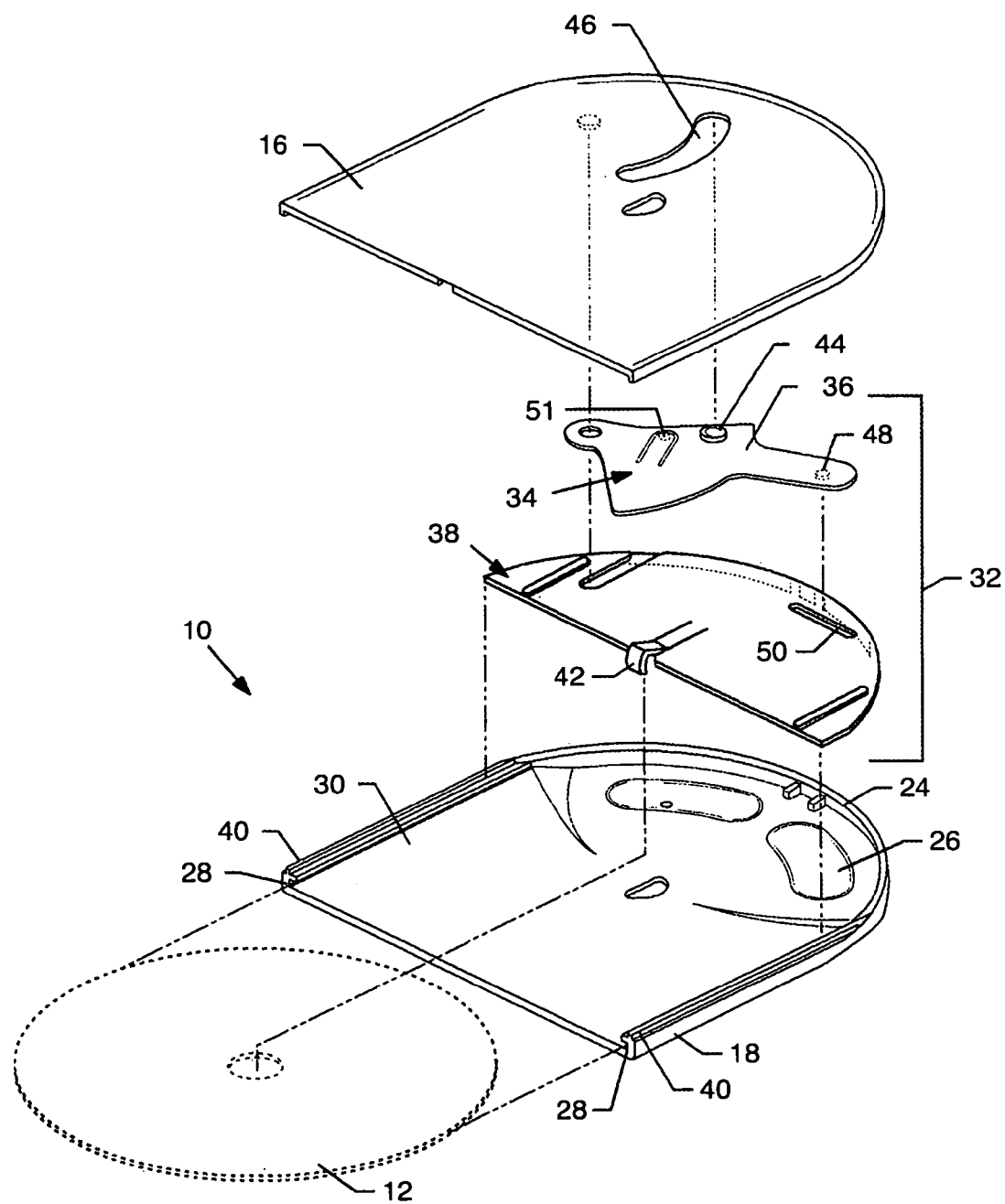
FIG. 4 is an exploded perspective view of the device of FIG. 3.

As shown in the drawings for purposes of illustration, the present invention resides in a hand-held disc storage, deployment and retrieval device, generally referred to by the reference number 10. The device 10 is designed to enable a user thereof to safely and securely store media discs, such as compact discs (CD), (DVD's), (CDRW's), and the like used to store and play music, software, electronic files and the like. Such discs are generally referred to herein by the reference number 12. The device 10 allows a user to deploy such a disc 12 to a disc reader or the like (not shown) with a single hand with minimal effort and distraction.

Referring now to FIGS. 1–4, the device 10 includes a housing 14. Typically, as illustrated in FIG. 4, the housing 14 is comprised of upper and lower members 16 and 18 which define an interior cavity 20, that is configured to store a media disc 12 therein. The housing 14 includes an aperture 22 along one side thereof which is sized to receive the disc 12 therethrough and into and out of the interior cavity 20. At generally the opposite end of the housing 14, the edge 24 is preferably rounded to distinguish the back of the housing 14 from the front. This is important because it eliminates use of the trial-and-error method associated with ascertaining which side of a traditional CD end case opens. The rounded back 24 also allows for easier handling of the device 10. In a particularly preferred embodiment, the housing 14 also includes hand grips 26 or the like which assists a user in grasping and handling the device 10. For example, as illustrated in FIG. 2, the hand grips 26 can be depressions molded into the lower housing member 18. Alternatively, the hand grips 26 could comprise multiple bumps or protrusions which provides friction, or any other means known in the art.

With reference now to FIG. 4, disc tracks 28 are preferably found in the housing 14 for guiding the disc 12 into and out of the interior cavity 20. The disc tracks 28 are slightly larger in diameter than the thickness of disc 12 and extend substantially the length of the housing 14. The housing 14, typically in the lower member 18 thereof, preferably also includes one or more disc ramps 30 which serve to guide the disc 12 into the guide tracks 28 and out of the interior cavity 20.

With reference now to FIGS. 4–7, a manually-actuated slider assembly 32 is provided for moving the disc 12 into a deployment position, wherein the disc 12 within the interior cavity 20 is moved by the slider assembly 32 through the aperture 22 and out of the interior cavity 20; or alternatively into a retrieval and storage position wherein the disc 12 is moved into the interior cavity 20. The slider assembly 32 includes a lever mechanism 34 comprising a pivot arm 36 disposed within the interior cavity 20 and pivotally connected to the housing 14, and a slider 38 which is operably connected to the lever-mechanism 34 and which travels along guide tracks 40 formed in the housing 14 for deploying and retrieving the disc 12. Preferably, the slider 38 includes a hook 42 which is adapted to engage a portion of the disc 12 to facilitate the deployment and retrieval thereof from the device 10.

A raised button or lever 44 extends upwardly from the pivot arm 36 through a slot 46 of the upper housing for manually-actuating the slider assembly 32. In a particularly preferred embodiment, a protrusion 48 extends downwardly from the pivot arm 36 for insertion into an elongated groove or slot 50 of the slider 38. Preferably, the lever-mechanism includes a locking detent 51 which locks within a mating depression formed in the housing 14. This feature locks the button or lever 44 in the closed position so that the disc 12 is not accidentally removed from the device 10 unless intentionally moved through slot 46 by releasing the detent 51.

As shown in FIGS. 4–9, the slider 38 includes a hook 42 extending therefrom which is resiliently pivotable along a vertical plane such that if the hook 42 is pivoted upwardly or downwardly, the resilient nature of the arm returns it to its original position. The hook 42 is configured to enter a central aperture of the disc 12. The hook 42 enters the aperture of the disc 12 from above the disc to retrieve the disc when the slider 38 is moved into the disc retrieval position over at least a portion of the disc 12. The hook 42 is forcibly removed from the disc aperture to release the disc 12 when a pulling force is applied to the disc 12 when the slider 38 is in the disc deployment position.

With particular reference to FIGS. 5–7, the deployment of a disc 12 is illustrated. The lever button 44 is moved from a retrieval and storage position at one end of the elongated slot 46 across the elongated slot 46 to an opposite end thereof for deploying the disc 12. As illustrated in FIGS. 5–7, the slider 38, and particularly the hook 42, serve to push the disc 12 out of the housing 14 for deployment into the proper reader, etc. Mechanical advantage is created by the arrangement of the end design of the slider assembly 32 such that the distance moved by the lever button 44 is less than the actual distance moved by the disc 12. For example, moving the lever button 1" could extend the disc 12 nearly 2.5". This is due to the pivotal connection of the pivot arm 34, arcuate nature of the slot 46, and interaction of the protrusion 48 and slider groove 50.

This action is illustrated in FIGS. 8 and 9, wherein a single hand 52 of the user is all that is necessary to push the lever button 44 with one's thumb or finger between the deployment and retrieval positions to move the disc 12 into and out of the internal cavity 20 of the housing 14, as described above. This is particularly beneficial when inserting music CD's into a CD player of a moving car or the like wherein minimal distractions are acquired to avoid accidents. The user can grasp the device 10 and determine the backside 24 of the housing 14, due to the rounded back nature thereof. The user will also be able to feel the hand grips 26 to determine the top and bottom of the housing 14. The user can then place the front aperture 22 of the housing 14 adjacent to the CD player entry aperture and deploy the CD, as illustrated in FIGS. 8 and 9, with a single hand and with minimal distraction so as to maintain concentration on the road and control of the vehicle.

Once the CD is to be removed from the automobile CD player, the driver places an empty device 10 adjacent to the outlet of the CD player such that the CD is received within aperture 22. The lever/button 44 is moved into the deployment position such that the hook 42 can be inserted into a central aperture 60 of the disc 12, and then the button 44 is retracted to the retrieval or storage position so as to draw the disc 12 within the interior cavity 20 of the housing 14 for storage until later deployment. Once again, this can be done with a single hand with minimal, if any, distraction. Even when not driving a car, the device 10 of the present invention provides advantages as the disc 12 is not handled—thus avoiding scratches, dirt, etc. on the reading surface thereof.

Figure 10:
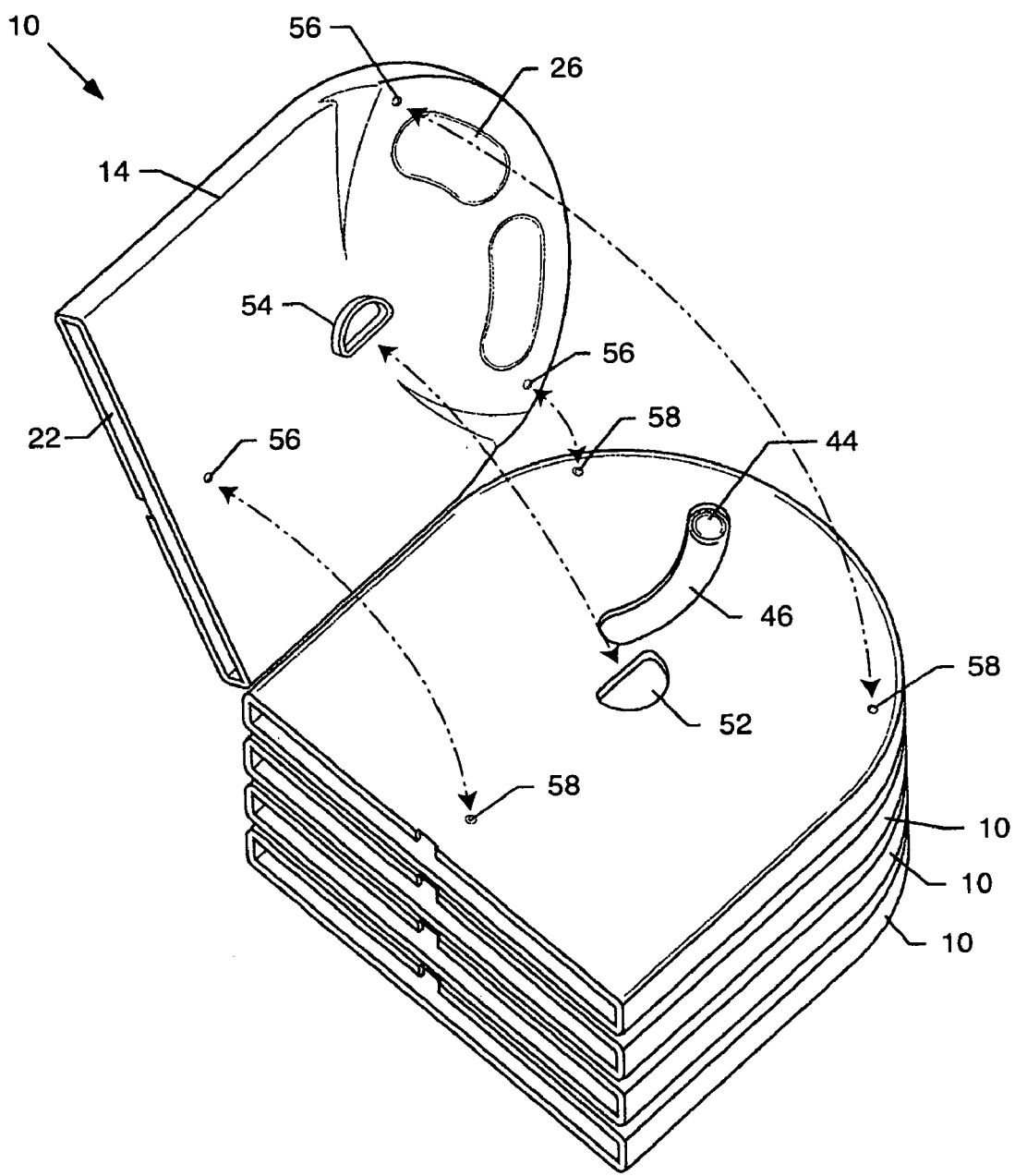
FIG. 10 is a perspective view illustrating the stacking and interlocking nature of multiple devices, in accordance with the present invention.

With reference now to FIG. 10, the exterior confirmation of the housing 14 is configured such that multiple devices 10 can be stacked upon one another in interlocking fashion. In particular, opposing surfaces of the housings 14 have indentations or apertures which receive protrusions of the device housing 14 immediately above or below it. As illustrated in FIG. 10, in a particularly preferred embodiment, a generally centered aperture 52, which extends through the housing 14 has a raised lip 54 on a lower surface of the housing 14, which is configured to nest within a slightly larger opening 52 of the aperture on a top surface of an adjoining device housing 14. In this manner, multiple housings 14 can be stacked upon one another and only be removed vertically with application of slight pressure. Additional protrusions 56 may extend from the lower surface of the housing 14 which are received within mating apertures 58 of the top surface of the adjoining device 10. This further serves to interlock the device housings 14 to one another in stacked relation. Thus, for example, in one's car or office a plurality of discs 12 can be stacked in the devices 10 in an neat and orderly manner. Although not illustrated, it is contemplated by the present invention that a lowermost housing 14 have a cup-holder extension body extending therefrom for insertion into a cup holder or the like for holding a stack of disc housings 14 on one another in a cup holder of an automobile for easy access by the driver or passenger of the vehicle.

Figure 11:
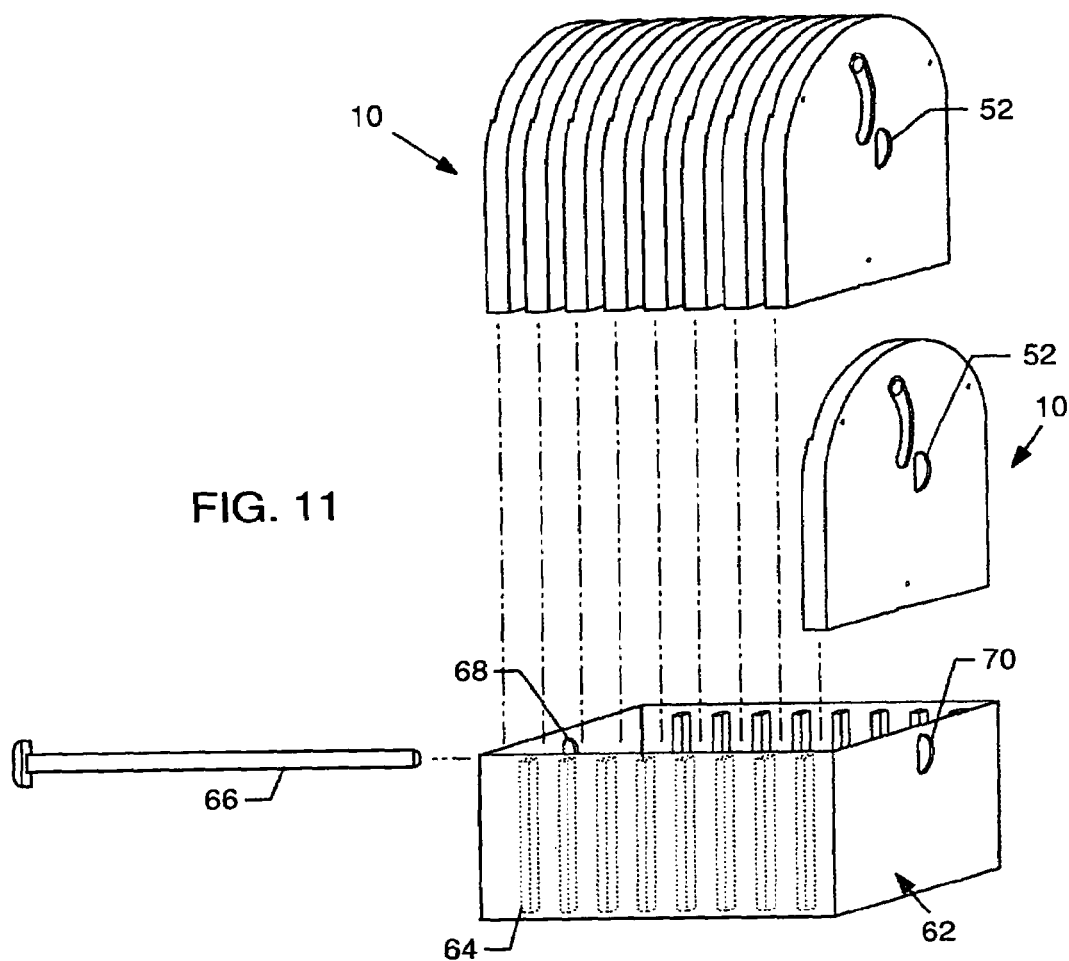
FIG. 11 is a partially exploded perspective view of multiple devices embodying the present invention being disposed within a storage case.
Figure 12:
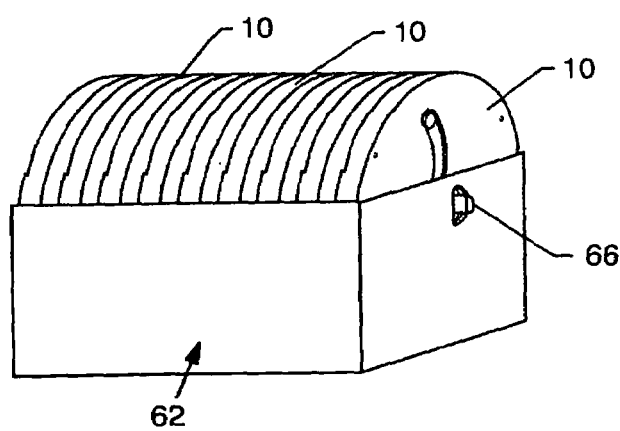
FIG. 12 is a side perspective view of the locked storage case, illustrating multiple devices embodying the present invention stored therein.

With reference now to FIGS. 11 and 12, the preferred embodiment of the present invention also contemplates a system for locking a disc 12 within a device 10, or multiple devices 10 to one another. This is to provide security from theft of the disc 12. In a particularly preferred embodiment, as illustrated in FIGS. 11 and 12, a carrying case or tray 62 is sized and configured so as to receive a plurality of devices 10 therein, such as in stacked relation, or in slots 64 provided in the interior of the case 62. When in the stored position, the central aperture 60 the disc 12 is aligned with the central aperture 52 of the device housing 14. This enables a locking pin 66 to be inserted through these apertures 52 and 60 by lock and key mechanism, or any other known locking mechanism, such that the disc 12 cannot be removed from the device 10 without destroying the device 10 or even the disc 12. Of course, such would render the disc 12 useless and remove the motivation from the would be thief.

Preferably, multiple devices 10 are locked to one another, and their disc 12 contents locked therein as well, by placement in the tray or case 62 which has apertures 68 and 70 on opposite ends thereof and which are aligned with the apertures 52 and 60 of the devices 10 and discs 12. The locking pin 66 is then inserted through all of the apertures 52, 60, 68 and 70 such that it engages a locking mechanism, such as a key-actuated mechanism or the like (not shown). Thus, only the owner of the discs 12 within the device 10 can access the discs 12 by unlocking the locking pin 66 and removing it from the case 62 and devices 10.

It will be appreciated by those skilled in the art that the present invention provides many advantages over the currently used devices and systems. The device 10 of the present invention enables the driver of an automobile to safely deploy and retrieve music compact discs from a CD player of the vehicle using a single hand and with minimal distraction. The device 10 of the present invention also safely stores the disc 12 therein to prevent it from coming into contact with contaminants and the like, and also enables the disc 12 to be locked to one or more device housings 14. Manual manipulation of the disc 12 is also avoided, thus avoiding scratches, smudges, etc. which can impair the reading of the disc.

Although several embodiments of the present invention have been described in detail for purposes of illustration, various modifications of each may be made without departing from the spirit and scope of the invention. Accordingly, the invention is not to be limited, except as by the appended claims.

What is claimed is:

1. A hand-held disc storage, deployment and retrieval device, comprising:

a housing defining an interior cavity adapted to store a disc therein;

an aperture formed in the housing and configured for receiving the disc therethrough and into or out of the interior cavity; and disc guide tracks formed in the housing for guiding the disc into and out of the interior cavity;

slider guide tracks formed in the housing above the disc guide tracks; and a manually-actuated slider disposed within the interior cavity and movable along the slider guide tracks between a disc deployment position wherein the disc within the interior cavity is moved by the slider through the aperture and out of the interior cavity, and a disc retrieval position wherein the disc is moved into the interior cavity;

wherein the slider includes a hook extending therefrom and resiliently pivotable along a vertical plane and configured to enter a central aperture of the disc from above the disc to retrieve the disc when the slider is moved into the disc retrieval position over at least a portion of the disc, and be forcibly removed from the disc aperture to release the disc when a pulling force is applied to the disc when the slider is in a disc deployment position.

2. The device of claim 1, including a manually actuated lever-mechanism operably connected to the slider for deploying and retrieving the disc.

3. The device of claim 2, wherein the lever-mechanism includes a lever extending from the housing and connected to a pivot arm disposed within the housing and engagable with the slider for moving the slider between the deployment and retrieval positions.

4. The device of claim 3, wherein the lever travels along a slot formed in the housing, and wherein the pivot arm is pivotally connected to the housing.

5. The device of claim 1, wherein the exterior conformation of the housing is configured to interlock with the exterior conformation of a second housing stacked thereon.

6. The device of claim 5, wherein the housing includes a protuberance extending from a surface thereof, and a protuberance-accepting depression formed in a generally opposite surface thereof.

7. The device of claim 1, including means for locking the disc within the housing.

8. The device of claim 7 wherein the locking means comprises opposing apertures formed in the housing and alignable with a central aperture of the disc for acceptance of a locking pin therethrough.

9. The device of claim 8, including a case adapted for storing multiple housings therein in stacked relation with the locking pin extending from one end of the case, through the multiple housings and discs, to an opposite end of the case.

10. The device of claim 6, wherein the protuberance comprises a raised lip surrounding a first aperture formed in the housing aligned with the disc aperture, and a second aperture formed in an opposite wall of the housing and adapted to receive a corresponding raised lip of the second housing stacked thereon.

11. The device of claim 1, wherein the housing has a generally flat edge defining the disc receiving aperture, and a generally rounded edge at an end generally opposite the disc receiving aperture.

12. The device of claim 1, including hand grip depressions formed in the housing.

13. A hand-held disc storage, deployment and retrieval device, comprising:
  a housing defining an interior cavity adapted to store a disc therein;
  an aperture formed in the housing and configured for receiving the disc therethrough and into or out of the interior cavity;
  disc guide tracks formed in the housing for guiding the disc into and out of the interior cavity
  slider guide tracks formed in the housing above the disc guide tracks;
  a manually-actuated slider disposed within the interior cavity and movable along the slider guide tracks between a disc deployment position wherein the disc within the interior cavity is moved by the slider through the aperture and out of the interior cavity, and a disc retrieval position wherein the disc is moved into the interior cavity;
  a manually actuated lever-mechanism operably connected to the slider for deploying and retrieving the disc; and
  means for locking the disc within the housing, including opposing apertures formed in the housing and alignable with a central aperture of the disc for acceptance of a locking pin therethrough;
  wherein the slider includes a hook extending therefrom and resiliently pivotable along a vertical plane, the hook being configured so as to enter a central aperture of the disc from above the disc to retrieve the disc when the slider is moved into the disc retrieval position over at least a portion of the disc, and be forcibly removed from the disc aperture to release the disc when a pulling force is applied to the disc when the slider is in a disc deployment position.

14. The device of claim 13, wherein the lever-mechanism includes a lever extending from the housing and connected to a pivot arm disposed within the housing and engagable with the slider for moving the slider between the deployment and retrieval positions.

15. The device of claim 14, wherein the lever travels along a slot formed in the housing, and wherein the pivot arm is pivotally connected to the housing.

16. The device of claim 13, wherein the exterior conformation of the housing is configured to interlock with the exterior conformation of a second housing stacked thereon.

17. The device of claim 16, wherein the housing includes a protuberance extending from a surface thereof, and a protuberance-accepting depression formed in a generally opposite surface thereof.

18. The device of claim 17, wherein the protuberance comprises a raised lip surrounding a first aperture formed in the housing aligned with the disc aperture, and a second aperture formed in an opposite wall of the housing and adapted to receive a corresponding raised lip of the second housing stacked thereon.

19. The device of claim 13, including a case adapted for storing multiple housings therein in stacked relation with the locking pin removably extending from one end of the case, through the multiple housings and discs, to an opposite end of the case.

20. The device of claim 13, wherein the housing has a generally flat edge defining the disc receiving aperture, and a generally rounded edge at an end generally opposite the disc receiving aperture.

21. The device of claim 13, including hand grip depressions formed in the housing.

22. A hand-held disc storage, deployment and retrieval device, comprising:
  a housing defining an interior cavity adapted to store a disc therein;
  first and second generally aligned apertures formed in opposite top and bottom walls of the housing and aligned with an aperture of the disc therein;
  a raised lip extending outwardly from the circumference of the first aperture, wherein the raised lip of a first device is removably insertable into a second aperture of a second device in stacked relation to the device;
  an aperture formed in a generally flat first end of the housing and configured for receiving the disc therethrough and into or out of the interior cavity;
  a second end of the housing having a generally round configuration;
  disc guide tracks formed in the housing for guiding the disc into and out of the interior cavity
  slider guide tracks formed in the housing above the disc guide tracks;
  a manually-actuated slider disposed within the interior cavity and movable along the slider guide tracks between a disc deployment position wherein the disc within the interior cavity is moved by the slider through the aperture and out of the interior cavity, and a disc retrieval position wherein the disc is moved into the interior cavity;
  wherein the slider includes a hook extending therefrom and resiliently pivotable along a vertical plane, the hook being configured so as to enter a central aperture of the disc from above the disc to retrieve the disc when the slider is moved into the disc retrieval position over at least a portion of the disc, and be forcibly removed from the disc aperture to release the disc when a pulling force is applied to the disc when the slider is in a disc deployment position.

23. The device of claim 22, including a manually actuated lever-mechanism operably connected to the slider for deploying and retrieving the disc, including a lever extending from the housing and connected to a pivot arm disposed within the housing and engagable with the slider for moving the slider between the deployment and retrieval positions.

24. The device of claim 23, wherein the lever travels along a slot formed in the housing, and wherein the pivot arm is pivotally connected to the housing.

25. The device of claim 22, including means for locking the disc within the housing, including a locking pin extending through the aligned first and second housing apertures and the disc aperture.

26. The device of claim 22, including a case adapted for storing multiple housings therein in stacked relation with a locking pin removably extending from one end of the case, through the multiple housings and discs, to an opposite end of the case.

27. The device of claim 22, including hand grip depressions formed in the housing.

* * * * *